US009869036B2

(12) United States Patent
Feeney et al.

(10) Patent No.: US 9,869,036 B2
(45) Date of Patent: Jan. 16, 2018

(54) APPARATUS AND METHOD FOR CONTROLLING FABRIC WEB

(71) Applicant: GKN Aerospace Services Structures Corporation, Cromwell, CT (US)

(72) Inventors: Christopher John Feeney, Wallingford, CT (US); Steven Robert Hayse, Prospect, CT (US); David Andrew Rogozinski, Bristol, CT (US); Rene Alfred Varrato, Middletown, CT (US)

(73) Assignee: GKN Aerospace Services Structures Corporation, Cromwell, CT (US)

( * ) Notice: Subject to any disclaimer, the term of this patent is extended or adjusted under 35 U.S.C. 154(b) by 465 days.

(21) Appl. No.: 14/684,875

(22) Filed: Apr. 13, 2015

(65) Prior Publication Data

US 2016/0298267 A1 Oct. 13, 2016

(51) Int. Cl.
*B29B 11/16* (2006.01)
*B29C 70/32* (2006.01)
(Continued)

(52) U.S. Cl.
CPC .............. *D01D 10/04* (2013.01); *B29B 11/16* (2013.01); *B65H 20/06* (2013.01); *D01D 11/04* (2013.01);
(Continued)

(58) Field of Classification Search
CPC ........ B29B 11/16; D01D 10/04; D01D 11/04; B65H 20/06; B65H 2404/261; B29C 70/54
(Continued)

(56) References Cited

U.S. PATENT DOCUMENTS

| 1,837,408 A | 12/1931 | Cluett |
| 2,117,954 A | 5/1938 | Greenwood |

(Continued)

FOREIGN PATENT DOCUMENTS

| DE | 2314172 A1 | 10/1974 |
| EP | 1878562 A1 | 1/2008 |

(Continued)

OTHER PUBLICATIONS

PCT International Search Report and Written Opinion for PCT/US2012/070114 dated Jul. 10, 2013; (10 pages).

(Continued)

*Primary Examiner* — Joseph S Del Sole
*Assistant Examiner* — Emmanuel S Luk
(74) *Attorney, Agent, or Firm* — Bejin Bieneman PLC (57) ABSTRACT

An apparatus for controlling a composite fabric having internal axial tows includes a support member configured to engage the fabric substantially up to a composite component form. The support member includes a nonslip portion directly engaging a first outer surface of the fabric. The apparatus further includes a primary securing member engaging and applying pressure on the fabric at a second outer surface of the fabric opposite the first outer surface. Upon displacement of the axial tows of the fabric relative to the first and second outer surfaces, the support member and the primary securing member substantially maintain original configurations of the first and second outer surfaces of the fabric engaged between the support member and the primary securing member.

12 Claims, 11 Drawing Sheets

(51) Int. Cl.
*B29C 70/44* (2006.01)
*D01D 10/04* (2006.01)
*D01D 11/04* (2006.01)
*B65H 20/06* (2006.01)
*B29C 70/54* (2006.01)

(52) U.S. Cl.
CPC ........ *B29C 70/54* (2013.01); *B65H 2404/261* (2013.01)

(58) Field of Classification Search
USPC .................................. 425/371, 373
See application file for complete search history.

(56) References Cited

U.S. PATENT DOCUMENTS

| | | | |
|---|---|---|---|
| 2,402,709 A | 6/1946 | Swasey | |
| 2,664,920 A | 1/1954 | Riddle | |
| 2,674,557 A | 4/1954 | Boggs | |
| 2,825,117 A * | 3/1958 | Perfect | B44C 3/08 162/206 |
| 2,890,515 A * | 6/1959 | Schwabe | D06C 29/00 26/18.6 |
| 3,046,771 A | 7/1962 | Bailey | |
| 3,226,273 A | 12/1965 | Becker | |
| 3,367,816 A | 2/1968 | Mills et al. | |
| 3,426,804 A | 2/1969 | Bluck | |
| 3,515,328 A * | 6/1970 | Smith, Jr. | B65H 20/06 226/172 |
| 3,559,253 A | 2/1971 | Pandell et al. | |
| 3,681,819 A | 8/1972 | Trifunovic et al. | |
| 3,962,394 A | 6/1976 | Hall | |
| 4,003,783 A | 1/1977 | Groome et al. | |
| 4,118,179 A | 10/1978 | Ballinger | |
| 4,249,689 A * | 2/1981 | Voytko | B65H 20/06 198/620 |
| 4,381,961 A | 5/1983 | Van Der Velden | |
| 4,601,928 A | 7/1986 | Van Der Velden | |
| 4,677,831 A | 7/1987 | Wunner | |
| 4,699,567 A | 10/1987 | Stewart | |
| 4,923,541 A | 5/1990 | Burger | |
| 4,984,728 A * | 1/1991 | Brinkmeier | B65H 20/06 226/172 |
| 5,259,901 A | 11/1993 | Davis et al. | |
| 5,592,874 A * | 1/1997 | Blauhut | B27N 3/24 100/154 |
| 5,698,055 A | 12/1997 | Benkoczy | |
| 5,735,083 A | 4/1998 | Brown et al. | |
| 5,809,805 A | 9/1998 | Palmer et al. | |
| 5,921,754 A | 7/1999 | Freitas et al. | |
| 6,047,452 A | 4/2000 | Caruso | |
| 6,808,796 B1 | 10/2004 | Miyao et al. | |
| 6,827,118 B2 | 12/2004 | Wienands et al. | |
| 7,770,837 B1 | 8/2010 | Head et al. | |
| 8,869,361 B2 | 10/2014 | Feeney et al. | |
| 8,900,392 B2 | 12/2014 | Hayse | |
| 8,918,970 B2 | 12/2014 | Hayse | |
| 2007/0144669 A1 | 6/2007 | Kikuchi et al. | |
| 2008/0116334 A1 | 5/2008 | Xie et al. | |
| 2008/0128073 A1 | 6/2008 | Xie et al. | |
| 2009/0098284 A1 | 4/2009 | Xie et al. | |
| 2009/0098337 A1 | 4/2009 | Xie et al. | |
| 2010/0084502 A1 * | 4/2010 | Hashikawa | B21C 47/003 242/419.8 |
| 2010/0115745 A1 * | 5/2010 | Morris | B65H 20/02 28/165 |
| 2012/0208419 A1 * | 8/2012 | Dommes | B29B 11/16 442/327 |
| 2012/0211538 A1 * | 8/2012 | Yamamoto | A61F 13/15764 226/95 |
| 2013/0164473 A1 | 6/2013 | Feeney et al. | |
| 2014/0080692 A1 * | 3/2014 | Lenser | A61F 13/15764 493/369 |
| 2016/0145801 A1 * | 5/2016 | Fujita | B65H 23/02 162/289 |

FOREIGN PATENT DOCUMENTS

| | | |
|---|---|---|
| FR | 2595621 A1 | 9/1987 |
| FR | 2633213 A1 | 12/1989 |
| GB | 2447071 A | 3/2008 |
| JP | 2006326945 A | 12/2006 |
| WO | 2007135418 A1 | 11/2007 |
| WO | 2008023293 A2 | 2/2008 |
| WO | 2008130738 A1 | 10/2008 |
| WO | 2008145105 A2 | 12/2008 |
| WO | 2009057023 A2 | 5/2009 |
| WO | 2014013141 A1 | 1/2014 |

OTHER PUBLICATIONS

PCT International Search Report for PCT/US2012/070105 dated May 20, 2013; (3 pages).
PCT International Search Report and Written Opinion for PCT/US2012/070100 dated Jul. 19, 2013; (9 pages).
PCT International Search Report for PCT/US2012/070127 dated Jun. 24, 2013 (4 pages).
International Search Report and Written Opinion for PCT/US2016/025815 dated Jun. 16, 2016 (11 pages).

* cited by examiner

APPARATUS AND METHOD FOR CONTROLLING FABRIC WEB

BACKGROUND

This disclosure relates to the formation of fabric preforms for composite components. In particular, this application relates to manipulation of a fabric to improve fabric preform quality.

Composite components are often used in applications in which having a high strength-to-weight ratio is important such as, for example, aircraft components. Many structural composite components can be made by wrapping a high-strength fabric around a form to create what is known as a fabric preform, applying a resin to the fabric preform, and then curing the resin to form the final composite component.

However, when wrapping multiple layers of material around a form or mandrel, it is notoriously difficult to create a fabric preform without flaws that compromise the structural integrity of the final composite part. During wrapping, the applied fabric may become distorted, creating wrinkles or waviness in the fabric preform. Any unintended areas of bulk that develop before application of the resin can result in non-uniformity in the final component and result in less than ideal mechanical properties.

Hence, a need exists for improved techniques for applying fabric to a form and, more specifically, for reducing and eliminating areas of imperfection during wrapping.

DRAWINGS

FIG. 4 is a partial view of the fabric preform of FIG. 2 with a cross section taken there through.

FIG. 5 is a partial view of the fan containment case or fan case of FIG. 3 with a cross section taken there through.

DETAILED DESCRIPTION

An apparatus and a method for controlling a fabric web are disclosed. More generally, this disclosure is directed at improved methods of producing fabric preforms that can be further processed to make composite components or parts. Typically, once the fabric preform is wrapped, resin can be introduced into the fabric preform to form a composite component. This resin could be provided in any of a number of ways including, but not limited to, injection molding and transfer molding such as resin transfer molding (RTM) and vacuum-assisted resin transfer molding (VARTM). After curing the resin, the high-strength fibers of the fabric are held in place within the resin matrix to provide the composite material.

For example, an apparatus for controlling a composite fabric having internal axial tows may comprise a support member configured to engage the fabric substantially up to a composite component form. The support member may include a nonslip portion directly engaging a first outer surface of the fabric. The apparatus may further include a primary securing member engaging and applying pressure on the fabric at a second outer surface of the fabric opposite the first outer surface. According to the principles of the present disclosure, upon displacement of the axial tows of the fabric relative to the first and second outer surfaces, the support member and the primary securing member may substantially maintain original configurations of the first and second outer surfaces of the fabric engaged between the support member and the primary securing member.

In this exemplary apparatus, the support member may be a first conveyor belt, and the nonslip portion may include a high friction surface or a textured material fixed to the first conveyor belt. The nonslip portion may cover the first conveyor belt. Additionally, the apparatus may further comprise an actuator coupled to the primary securing member, which actuator may generate pressure between the primary securing member and the support member. The primary securing member may be one of a second conveyor belt, a film, and a pressure bladder. In one example, the primary securing member is the film, and the actuator is a vacuum.

The apparatus may further comprise a secondary securing member increasing the pressure on at least a portion of the fabric. In some implementations, the secondary securing member increases the pressure on substantially all of the fabric engaged between the support member and the primary securing member. The secondary securing member can be one or multiple members applying different pressure at different locations along or across the fabric.

In the exemplary apparatus, the original configurations of the first and second outer surfaces of the fabric may be complementary web configurations defined by a plurality of woven bias tows.

In another example, a method for controlling a composite fabric having internal axial tows, may comprise supporting the fabric with a support member substantially up to a composite component form; directly engaging a first outer surface of the fabric with a nonslip portion of the support member; engaging a primary securing member on the fabric at a second outer surface of the fabric opposite the first outer surface; applying pressure on the fabric with the primary securing member; and, upon displacement of the axial tows of the fabric relative to the first and second outer surfaces, substantially maintaining original configurations of the first and second outer surfaces of the fabric engaged between the support member and the primary securing member. The support member may be a first conveyor belt. The nonslip portion may include a high friction surface or a textured material fixed to the first conveyor belt. The method may further comprise covering the first conveyor belt with the nonslip portion.

The method may further comprise generating the pressure on the fabric with an actuator coupled to the primary securing member. The primary securing member is one of a second conveyor belt, a film, and a pressure bladder. In one implementation, the primary securing member is the film, and the actuator is a vacuum.

The method may further comprise increasing the pressure on at least a portion of the fabric with one or several secondary securing members, and it may further comprise increasing the pressure on substantially all of the fabric engaged between the support member and the primary securing member with the secondary securing member.

In the exemplary method, the original configurations of the first and second outer surfaces of the fabric are complementary web configurations defined by a plurality of woven bias tows.

In this detailed description, some exemplary fabric preforms and composite components are provided in which composite components for aircraft are described. However, the illustrated preforms and components should not be construed as the only preforms and components to which the recited methods are applicable. The methods described herein may also be used to make non-aircraft composite components, as well as other processes in which fabric is wrapped around a form to create a fabric preform.

Figure 1:
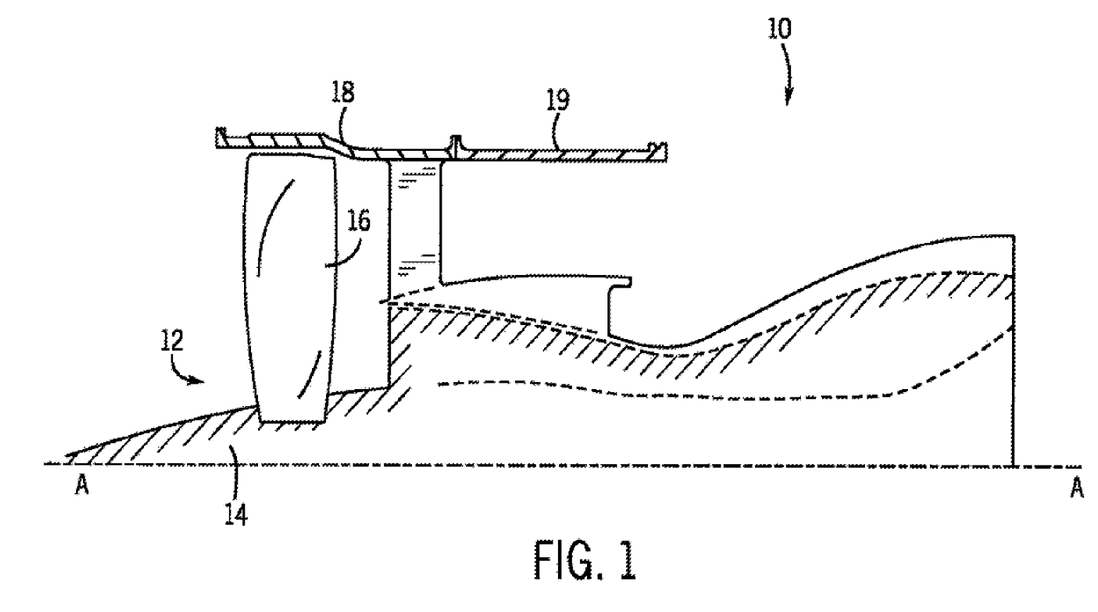
FIG. 1 is a partial cross-sectional side view of a turbofan engine including a fan containment case and a fan case.

Referring first to FIG. 1, a portion of a turbofan engine 10 for an aircraft is illustrated. This turbofan engine 10 includes a fan assembly 12 that is rotatable about a central axis A-A of the turbofan engine 10 to intake air and, ultimately, produce propulsion. The fan assembly 12 has a central rotor 14 that extends along the central axis A-A and includes a plurality of blades 16 that extend generally radially outward from the central rotor 14.

The exemplary fan assembly 12 is surrounded, at least in part, by a fan containment case 18. This fan containment case 18 is made of a high-strength composite material such as a fabric encased in a resin. For aircraft components, the fabric may be made of a carbon fiber material and the resin may be an epoxy or a high-temperature resin such as bismaleimide or polyimide to make an extremely strong and rigid component that is stable at high temperatures. However, other fabrics and resin material might be used depending on the demands of the application. Some of the materials that may be used to construct composite materials will be discussed in further detail below. The fan containment case 18 may help to prevent any projectiles from radially exiting the turbofan engine 10 in a direction that could damage the engine 10 or the aircraft.

FIG. 1 also shows a fan case 19 attached behind the fan containment case 18. This fan case 19 can be made of similar materials to the fan containment case 18 and continues the duct within which the engine bypass air flows.

Turning now to FIGS. 2 through 5, a fabric preform 20 for a fan containment case 18 having an axis B-B is illustrated before and after flanges 22 are formed on the axial ends 24 and 26. The fabric preform 20 has a generally tubular body 28 extending between the two axial ends 24 and 26. The body 28 includes a radially-inward facing surface 30 that contacts a form or mandrel during formation and a radially-outward facing surface 32. The body 28 includes a joggle or a portion of curvature 34 that separates the body 28 of the fan containment case 18 into two sections 36 and 38 of different diameter or radius. These sections 36 and 38 of differing diameters can help to accommodate a particular position of the blades 16 (as seen, for example, in FIG. 1) and may also serve to direct the air flow through the turbofan engine 10. This joggle or portion of curvature 34 is a feature of the body 28 that extends, at least in part, in the radial direction.

Figure 2:
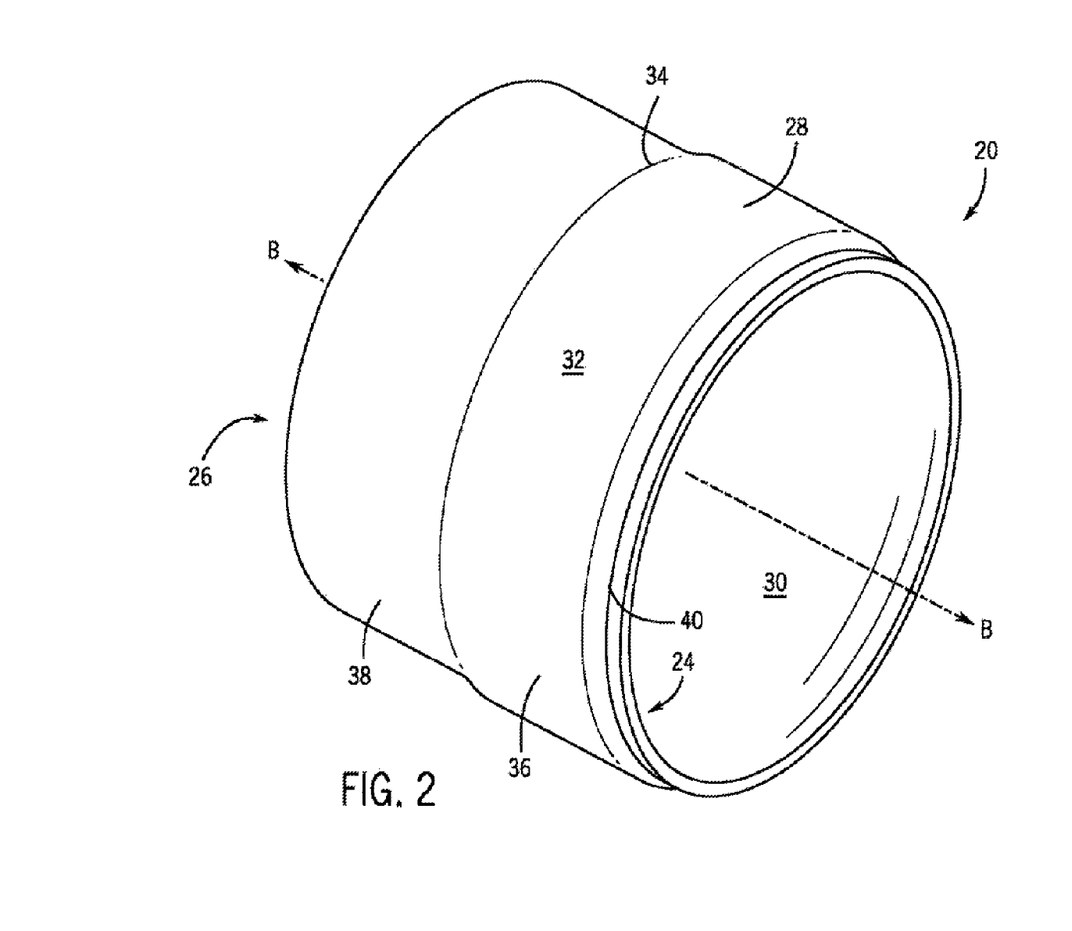
FIG. 2 is one embodiment of a fabric preform for a fan containment case or fan case.
Figure 3:
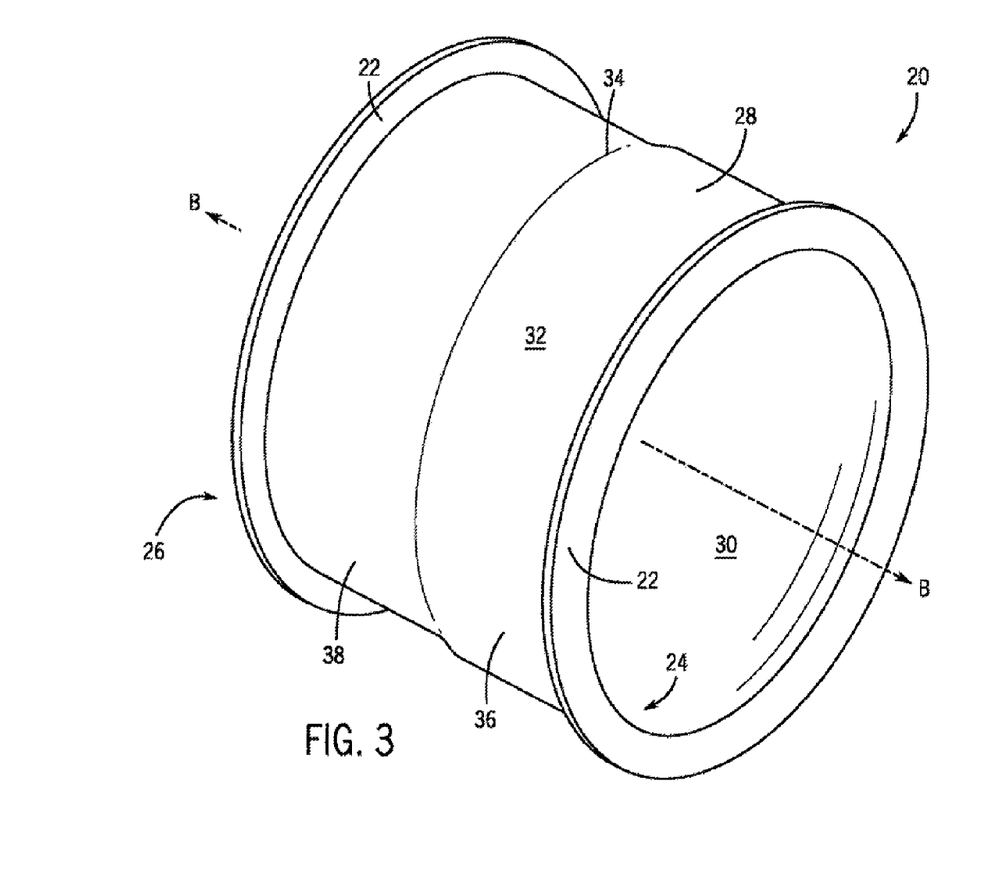
FIG. 3 is a fan containment case or fan case similar to FIG. 2, but after flanges have been formed at the axial ends of the generally tubular body.
Figure 4:
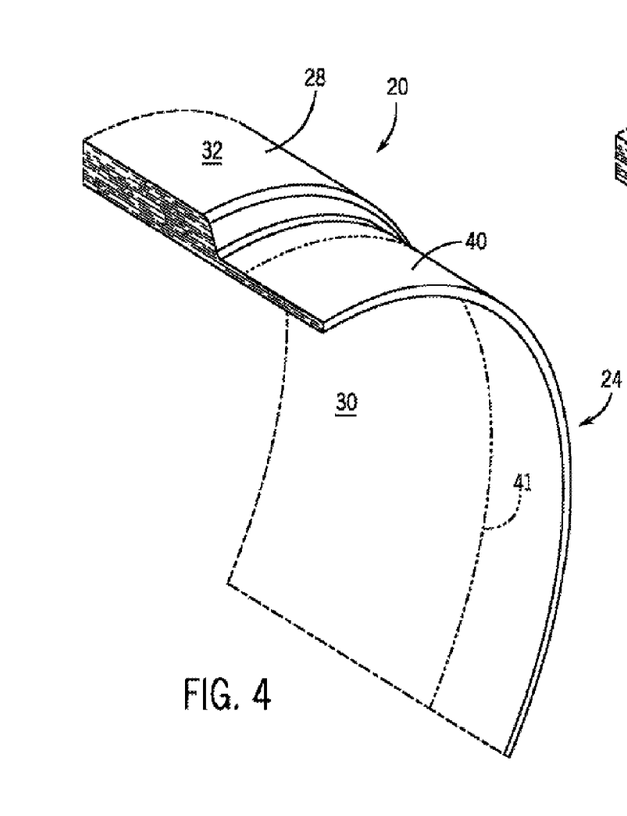
Figure 5:
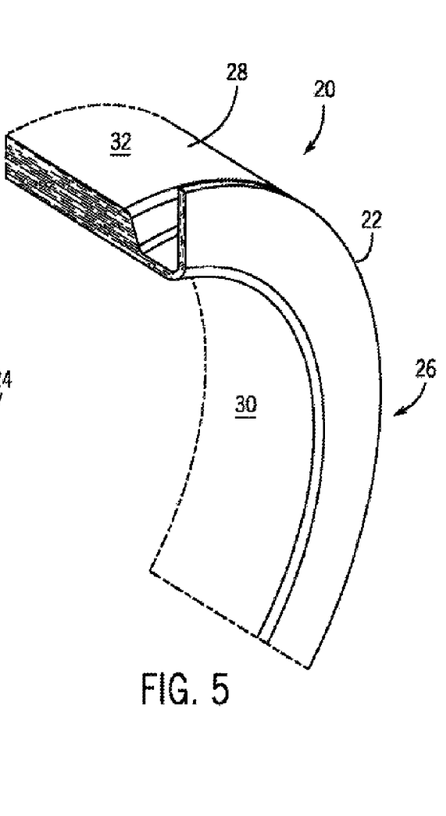

With particular reference to FIGS. 2 and 4, the fabric preform 20 for the fan containment case 18 may be formed such that the axial ends 24 and 26 are thinner than the remainder of the generally tubular body 28 to define precursor flange regions 40 on the axial ends 24 and 26. Before the introduction of the resin, these precursor flange regions 40 might be bent upward at the line 41 on FIG. 4 to form the flanges 22 that are used to attach the fan containment case 18 to adjacent components in the final assembly. It is likewise possible that these precursor flange regions 40 might be bent downward at the line 41 on FIG. 4 to form the flanges 22. However, it is also contemplated that by employing the fabric manipulation techniques below, that the flanges 22 might be formed concurrently with the wrapping of the fabric. It is likewise possible to conceive of a design that has only one flange at either end 24 or 26, or no flanges at all.

The fabric preform 20 for the fan containment case 18 includes multiple wrapped layers of fabric. The thickness of the fan containment case 18 is dictated in part by the number of layers of fabric and the thickness of the fabric. However, the quality of the wrapping and bulkiness of the fabric will also affect the thickness of the fabric preform 20 and the resultant composite component.

Figure 6:
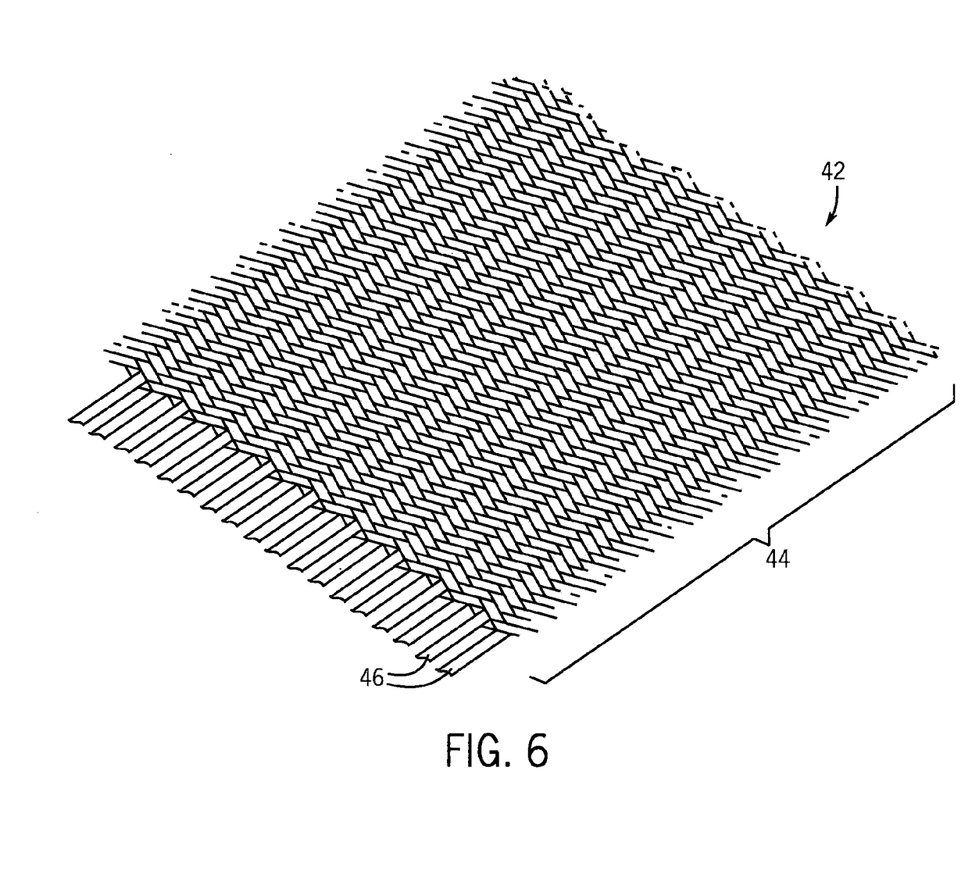
FIG. 6 illustrates a tri-axial fabric material that can be used to fabricate fabric preforms and composite components.
Figure 7:
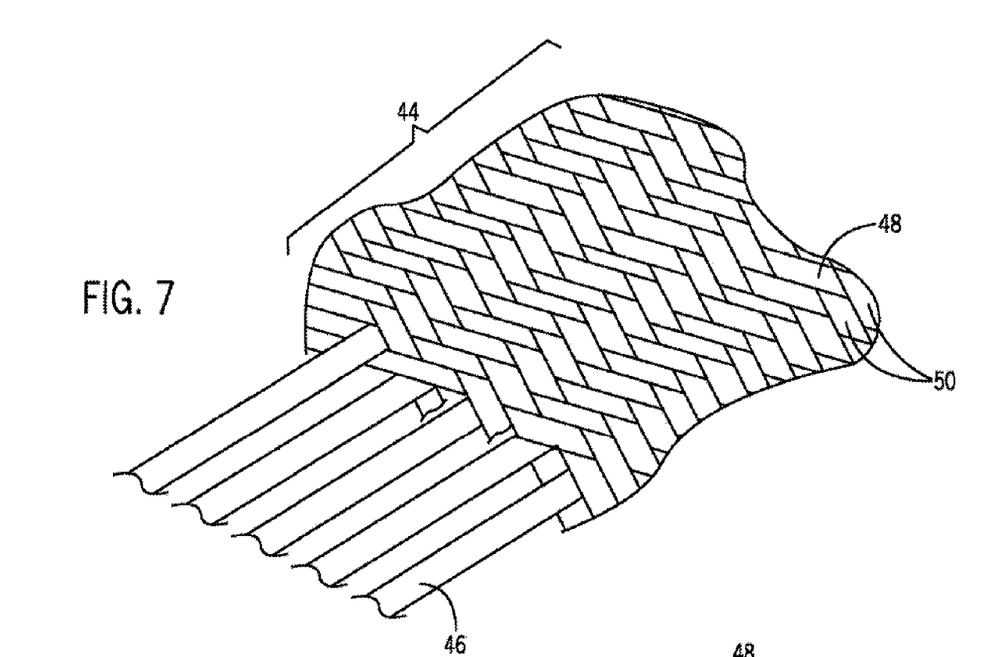
FIG. 7 is a detailed view of a segment of tri-axial fabric in which the axial or hoop tows extend from the end of the fabric.
Figure 8:
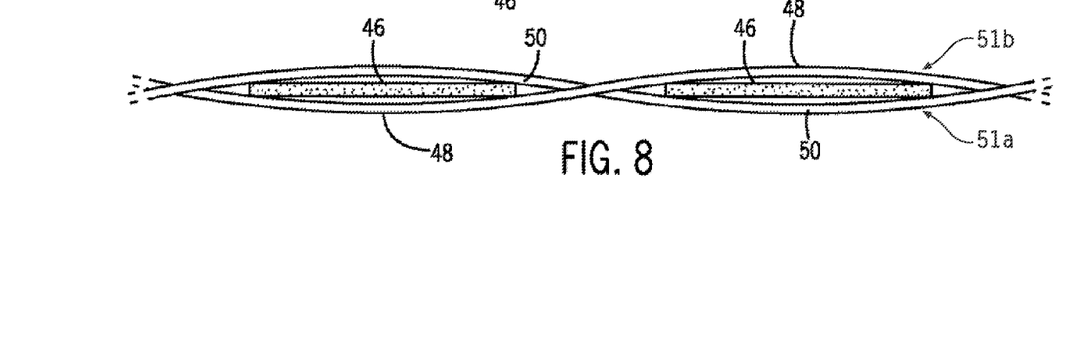
FIG. 8 is a cross-sectional side view of the tri-axial fabric.

Referring to FIGS. 6 through 8, an exemplary fabric in the form of a tri-axial fabric 42 is shown. The tri-axial fabric 42 includes various tows of the fabric material which are braided together to form a fabric sheet 44. The tri-axial fabric 42 includes a plurality of hoop or axial tows 46 and a plurality of bi-axial tows 48 and 50. As used herein, tows refer to a bundle of fibers or filaments so arranged as to form a continuous length of material. Typically, for aircraft composite structures, such tows are made of carbon fibers or graphite, which have desirable strength to weight characteristics. Additional materials, e.g. aramid fiber, ceramic fiber, and glass fiber materials, may be included in a fabric according to the principles of the present disclosure.

The hoop or axial tows 46 are arranged to be generally parallel with one another and internal to the fabric 44. For the sake of clarity, these tows 46 extend in a direction that is generally parallel with the direction of travel of the fabric sheet 44 as the fabric sheet 44 is wrapped around a form or mandrel. Therefore, in the context of the fabric feeding or wrapping, these tows may be said to be axial. Because these tows 46 are then wrapped about a central axis of the form or mandrel, these tows 46 may also be referred to as "hoop tows" because they extend around the form in the hoop direction once the fabric 44 is laid onto the form.

The plurality of bi-axial tows 48 and 50 include two sets of tows that are oriented at a positive angle from the axial tows 46 and at a negative angle from the axial tows 46, respectively. The bi-axial tows 48 and 50 are alternatively passed over and under axial tows 46 to form opposing first and second outer surfaces 51a, 51b of the fabric sheet 44. With particular reference to FIG. 8, the bi-axial tows 48 and 50 may have a web configuration, e.g. may be woven so as to form a braid in the fabric sheet 44. This means that the axial tows 46 extend roughly linearly and internally through the fabric sheet 44 between the first and second outer surfaces 51*a*, 51*b*. When the fabric sheet 44 is laid flat in an original, undistorted web configuration, each of the sets of bi-axial tows 48 and 50 are generally parallel with one another (i.e., the various tows in the first set of bi-axial tows 48 are parallel with one another and the various tows in the second set of bi-axial tows 50 are parallel with one another).

Although a tri-axial fabric has been described and provides the base material for the production of the fabric preform 20 illustrated in the example composite component of a fan containment case 18, it is contemplated that other types of fabric may be used according to the principles of the present invention. Accordingly, it should be understood that other types of fabric having sufficient characteristics may be used, e.g. another fabric with internally extending axial tows.

Returning now to FIGS. 2 through 5 and more specifically with reference to FIGS. 4 and 5, multiple layers of the tri-axial fabric 42 are wrapped upon one another to create the fabric preform 20. The tri-axial fabric 42 is disposed in the fabric preform 20 such that the axial tows 46 extend along the hoop direction of the fabric preform 20 and are generally perpendicular to the axis B-B, while the bi-axial tows 48 and 50 are generally helically disposed around the generally tubular body 28.

Generally, to form the fabric preform 20, one end of the fabric 44 is received on the form such that the axial tows of the fabric extend in a direction generally perpendicular to the central axis of the form. The fabric 44 is then wrapped about the form, normally by the rotation of the form pulling the fabric 44 onto the form, to lay down the layers of the fabric 44 (although it is possible that the free end of the fabric may be orbited around the form either while the form is held stationary or while the form also rotates).

Figure 9:
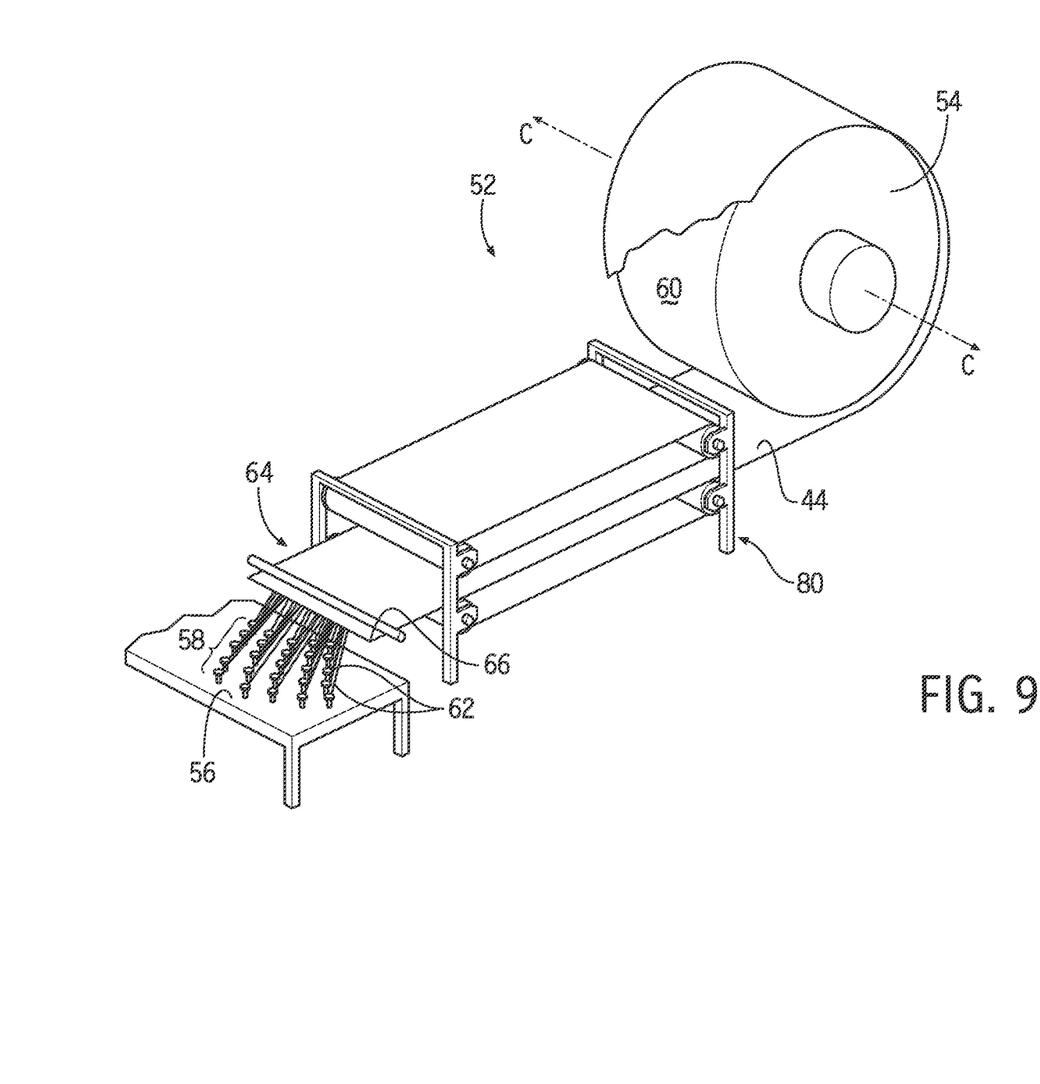
FIG. 9 is an illustration of a schematic for an apparatus used to form a fabric preform while separately tensioning each of the axial tows and while maintaining the configuration of the bi-axial tows according to the principles of the present disclosure.

Referring to FIG. 9, an apparatus 52 is shown that may be used to wrap the fabric 44 around a form 54 while simultaneously tensioning each of the axial or hoop tows 46 separately and independently from each other and the tensioning resultant from wrapping. The apparatus 52 includes the form 54 having a central or rotational axis C-C and may further include a table 56 spaced from the form 54 that supports a plurality of separate tensioning mechanisms 58. According to the principles of the present disclosure, and as discussed in further detail herein, the apparatus 52 may further include a support assembly 80, engaging and controlling the fabric 44 substantially up to the form 54.

In the exemplary illustration of FIG. 9, the form 54 is a rotatable mandrel that receives one end of the fabric 44 there on. The reception of the end of fabric 44 may be made in any of a number of ways including, for example, attachment of one end of the fabric 44 to the form 54 by taping, adhesive, fasteners, clamping, or so forth. The fabric 44 may also be received on the form 54 by wrapping the fabric 44 around the form 54 at least one full rotation and then holding the fabric 44 taut such that the tension of the fabric 44 wrapped over itself holds the fabric 44 on the form 54.

The form 54 may have a variety of shapes. For example, the form could have a square or rectangular cross section which would result in a tubular rectangular shape for the fabric preform. In another example, the form could have a radius that varies over at least a portion of the axial length of the form. This variable radius could be used to form a joggle or a like, such as is found on the fan containment case 18 depicted in FIG. 1.

The tensioning mechanisms 58 of the apparatus 52 are fanned out or spread out across the table 56. Each of the tensioning mechanisms 58 have a line 62 that feeds out there from. These lines 62 are each coupled to one of the axial tows 46 on a free end 64 of the fabric 44 (that is, the end of the fabric 44 opposite to the end of the fabric 44 that is initially wrapped around or received on the form 54 such that the axial tows 46 extend from one end to the other end). The lines 62 from the tensioning mechanisms 58 are fed through a guide or comb 66 such that the each of the lines 62 are generally collinear with a corresponding axial tow 46 to which a line 62 is coupled. In this way, each of the tensioning mechanisms 58, which are considerably larger than the size of the axial tows 46, may be spaced apart from one another on the table 56 and provide ample clearance for the running of the lines 62.

In exemplary FIG. 9, each of the tensioning mechanisms 58 is a magnetic clutch. Each of the magnetic clutches have a spool that feeds the line 62 out there from. During this feed out of the line 62, the magnetic clutch may provide controlled resistance against the rotation of the spool as the line 62 is pulled or unwound from the spool. Because each line 62 is attached to an axial tow 46, each of the axial tows 46 are separately and independently tensioned and paid out.

As used herein, for an axial tow to be "separately tensioned" means that the axial tow is tensioned apart from at least some of the other axial tows in the fabric. This separate tensioning may result in one or more of the axial tows 46 slipping within the bi-axial tows 48 and 50 of the fabric 44. However, in other forms the separate tensioning of the axial tows may be performed in groups. For example, two or more axial tows might be tensioned apart from the other tows.

With continued reference to FIG. 9, the tensioning mechanisms 58 may be set to provide the same tension or substantially the same tension to each of the axial tows 46. Due to either differences in the fabric 44 itself, or in the shape of the form 54 over its axial length, separately maintaining a constant axial tension over the various axial tows 46 can result in a differential pay out of the axial tows 46 in the fabric 44.

The ability for the axial tows 46 to pay out differentially may be used to improve the quality and consistency of the fabric preform 20. However, the slippage must overcome the substantial friction between the axial tows 46 and the bi-axial tows 48 and 50. That is, friction between one or more of axial tows 46 drawn through the bi-axial tows 48 and 50 may result in a necking down of the fabric 44 with buckling of the bi-axial tows 48 and 50. According to the principles of the present disclosure, the support assembly 80 engages and controls the fabric 44 substantially up to the form 54, specifically maintaining the original configuration of the bi-axial tows 48 and 50 (e.g. web configuration) upon slippage of one or more axial tows 46. The support assembly 80 is described in further detail below.

Figure 10:
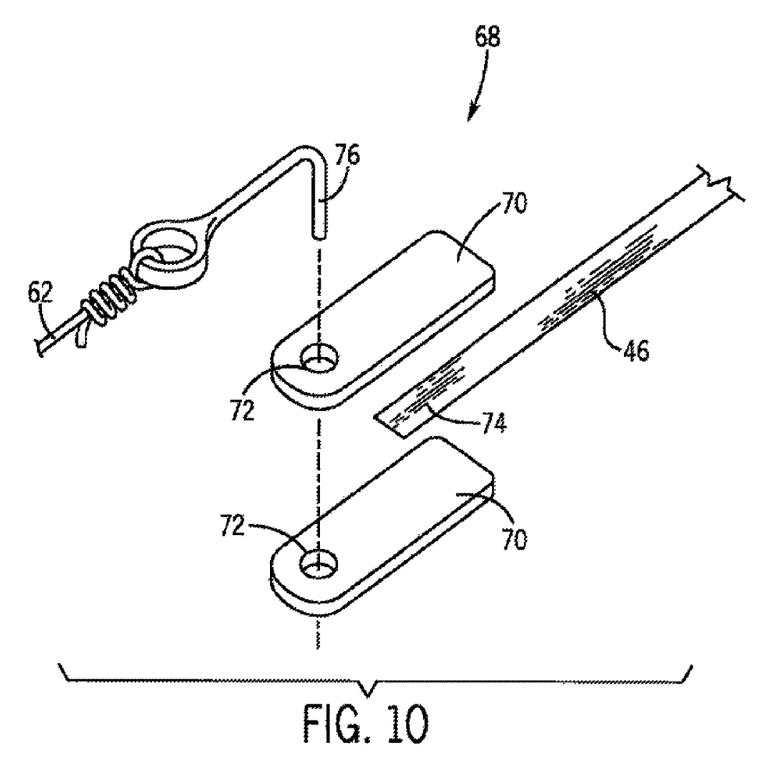
FIG. 10 is one embodiment of an intermediate connector that may be used to connect an axial tow to a tensioning mechanism.

In some implementations, the lines 62 from the tensioning mechanisms 58 may be directly connected to the axial tows 46. In some implementations, the axial tows 46 may be connected to the lines 62 via an intermediate connector. One exemplary intermediate connector 68 is partially illustrated in FIG. 10. This intermediate connector 68 includes a pair of pads 70 with apertures 72. The pads 70 may be disposed on either side of an end 74 of an axial tow 46 and then put together to sandwich the end 74 of the axial tow 46 there between. A hook 76 tied to the end of the line 62 may be directed through the aperture 72 in the pads 70 to temporarily link the pads 70 to the lines 62 of the tensioning mechanisms 58.

Because the fabric is more densely wrapped than in a fabric preform not formed by separately tensioning at least some of the plurality of axial tows, a higher fabric-to-resin volumetric ratio may be realized in the composite component formed after resin is applied to the fabric preform.

Figure 11:
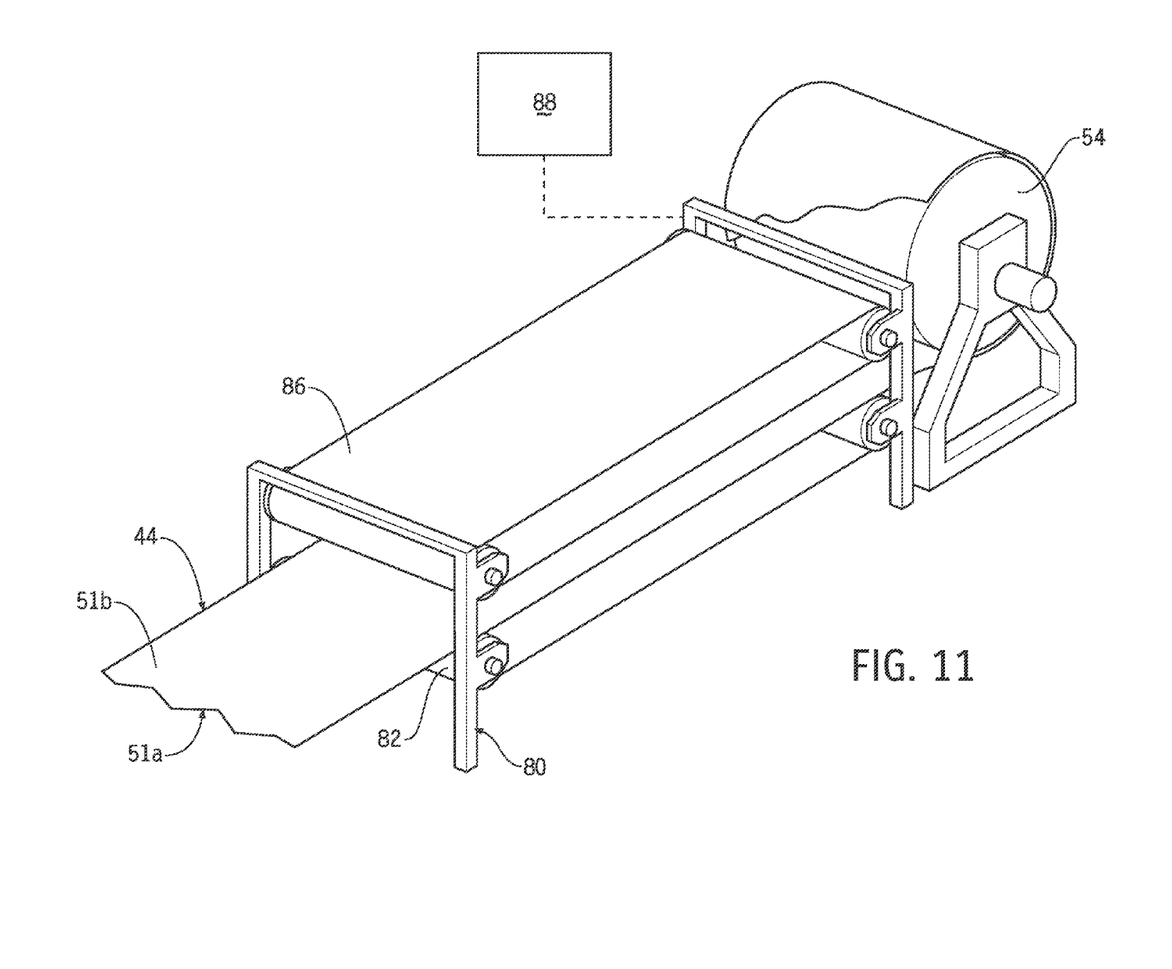
FIG. 11 is a perspective view of a support assembly for maintaining the configuration of the bi-axial tows according to the principles of the present disclosure, together with the form of FIG. 9.
Figure 12A:
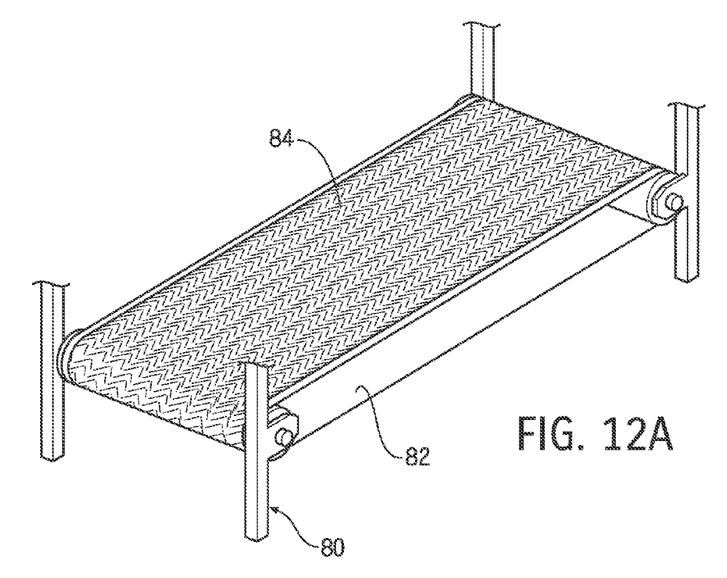
FIGS. 12A-B are exemplary perspective views of support members of the support assembly according to the principles of the present disclosure, each in the form of a conveyor belt, having a nonslip portion covering all and part of the conveyor belt, respectively.
Figure 12B:
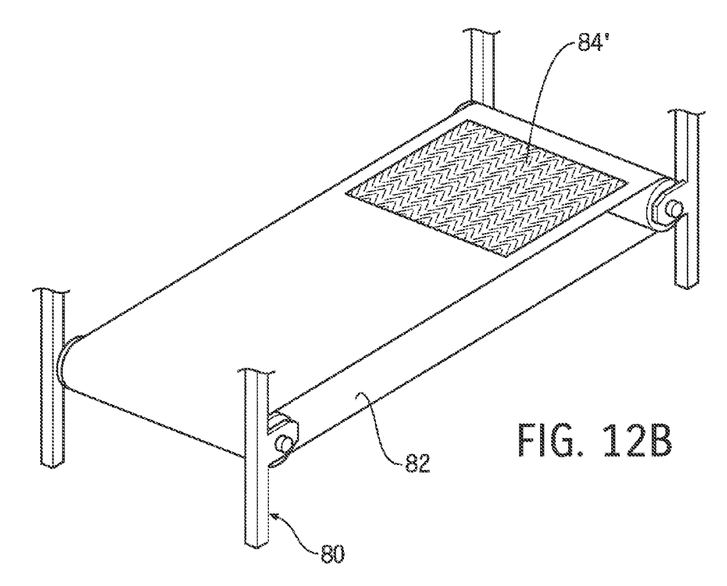
Figure 13A:
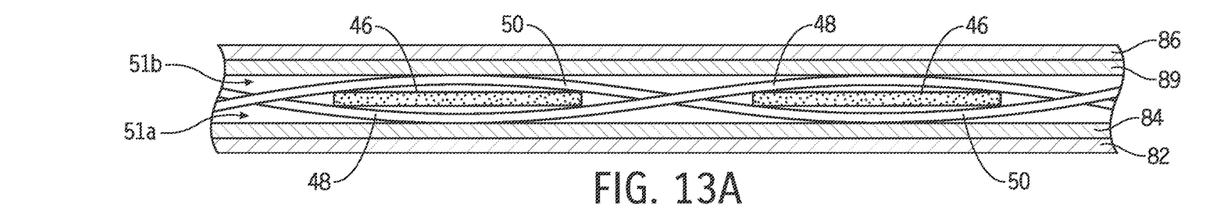
FIGS. 13A-C are cross-sectional side views of the tri-axial fabric engaged by the support and securing members according to the principles of the present disclosure.
Figure 13B:
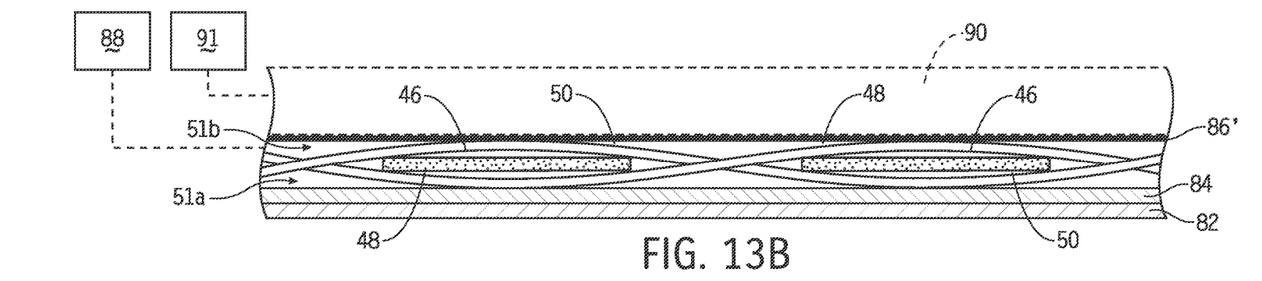
Figure 13C:
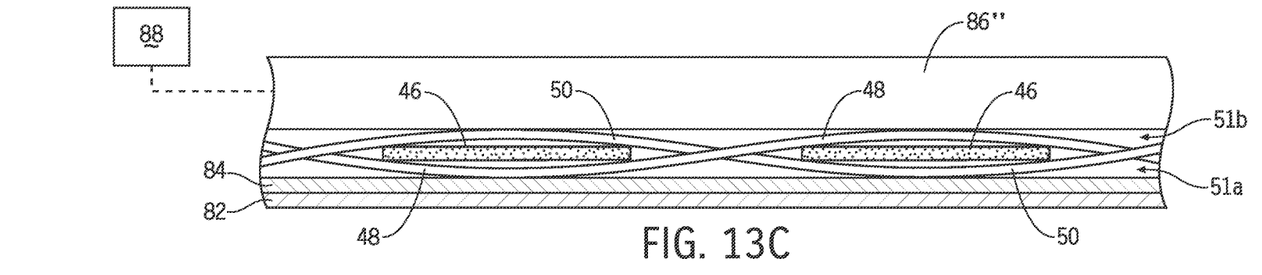

Referring to FIGS. 11-13, the support assembly 80 is described in further detail. The support assembly 80 includes a support member 82. As illustrated, the exemplary support member 82 is in the form of a conveyor belt. The support member 82 is configured to engage the fabric 44 substantially up to the form 54. That is, the support member 82 defines the path of the fabric 44 immediately, or substantially immediately, prior to wrapping onto the form 54.

According to the principles of the present disclosure, the support member 82 includes a relatively nonslip portion 84 that directly engages the first outer surface 51a of the fabric 44. In some implementations, the nonslip portion 84 is a textured material, e.g. sandpaper, fixed to support member 82. The nonslip portion 84 covers at least a portion of the support member 82. In some implementations, such as shown in FIG. 12A, the nonslip portion 84 covers the entire surface of the support member 82. In some implementations, the nonslip portion covers a portion of the surface of the support member 82, such as the portion 84' in FIG. 12B.

The support assembly 80 further includes a primary securing member 86 engaging and applying pressure on the fabric 44 at the second outer surface 51b of the fabric 44 opposite the first outer surface 51a. In particular, upon displacement of the axial tows 46 of the fabric 44 relative to the bi-axial tows 48 and 50, and thus the first and second outer surfaces 51a, 51b, the support member 82 and the primary securing member 86 substantially maintain the original configurations of the first and second outer surfaces 51a, 51b, of the fabric 44 engaged between the support member 82 and the primary securing member 86, e.g. the web configurations defined by the bi-axial tows 48 and 50. That is, the total effective friction from the physical characteristics of the fabric 44 and the nonslip portion 84 as well as the pressure applied by the primary securing member 86, is sufficient to inhibit distortion of the bi-axial tows 48 and 50 due to the friction forces generated by the slippage of the axial tows 46 relative to the bi-axial tows 48 and 50. Accordingly, the axial tows 46 may differentially pay out, e.g. due to an eccentric shape of the form 54, and the bi-axial tows 48 and 50 may be substantially consistently delivered to the form 54 in their original configuration.

In some implementations, the support assembly 80 may further include an actuator 88—schematically illustrated in FIG. 11—coupled to the primary securing member 86 and generating pressure between the primary securing member 86 and the support member 82.

Moreover, the configuration of the primary securing member may vary according to the principles of the present disclosure. In a first implementation, where the support member 82 is in the form of a first conveyor belt, the primary securing member 86 may be in the form of a second conveyor belt. In some implementations, the second conveyor belt may be free of nonslip portions. In some implementations, the second conveyor belt may include one or more nonslip portions 89 (FIG. 13A), such as described herein with regard to the nonslip portion 84 of the support member 82, and the second conveyor belt may further have a complementary configuration to the first conveyor belt.

Referring to FIG. 13B, in other implementations, an alternate primary securing member 86' may be a diaphragm. The diaphragm may be mechanically secured or actuated over the fabric 44 to provide pressure to same. In some implementations, the actuator 88 is in the form of a vacuum, and the diaphragm engages the fabric 44 under vacuum pressure. Suitable materials for such a diaphragm may include one or more of a variety of known elastomeric materials, such as elastomeric silicone and plastic, and may be in the form of a film.

Referring to FIG. 13C, in yet other implementations, another alternate primary securing member 86" may be in the form of a pressure bladder that inflates to engage the fabric 44 and provide pressure thereto as described herein. It should be understood that the various implementations of the primary securing member described herein are exemplary, and the primary securing member may have further configurations according to the principles of the present disclosure. Suitable materials for such a pressure bladder may include one or more of a variety of known elastomeric materials, such as elastomeric silicone and plastic.

Additionally, in some implementations, the support assembly 80 includes one or several secondary securing members for increasing the pressure on at least a portion of the fabric 44. Referring again to FIG. 13B, an exemplary secondary securing member 90, in the form of a pressure bladder, is illustrated. A secondary actuator 91 may be included and coupled to the secondary securing member 90. In this example, the primary securing member 86' is a film, and the secondary securing member 90 may inflate to engage the primary securing member 86' and provide further pressure to at least a portion of the fabric 44. In some implementations, the secondary securing member 90 may be configured to increase the pressure on substantially all of the fabric 44 engaged between the support member 82 and the primary securing member.

In the drawings, the same reference numbers indicate the same elements. Further, some or all of these elements could be changed. It should be understood that, as used herein, exemplary refers to serving as an illustration or specimen, illustrative, or typical. Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their ordinary meanings as understood by those skilled in the art unless an explicit indication to the contrary is made herein. In particular, use of the singular articles such as "a," "the," "said," etc. should be read to recite one or more of the indicated elements unless a claim recites an explicit limitation to the contrary.

The invention claimed is:

1. An apparatus for controlling a composite fabric having internal axial tows, comprising:
   a conveyer belt configured to engage the fabric substantially up to a composite component form, the conveyer belt including a nonslip portion directly engaging a first outer surface of the fabric;
   a diaphragm engaging and applying pressure on the fabric at a second outer surface of the fabric opposite the first outer surface;

a vacuum coupled to the diaphragm on the side of the diaphragm facing the fabric and generating pressure between the diaphragm and the conveyer belt, wherein, upon displacement of the axial tows of the fabric relative to the first and second outer surfaces, the conveyer belt and the diaphragm substantially maintain original configurations of the first and second outer surfaces of the fabric engaged between the conveyer belt and the diaphragm.

2. The apparatus of claim 1, wherein the nonslip portion includes a textured material fixed to the conveyor belt.

3. The apparatus of claim 1, wherein the nonslip portion covers the conveyor belt.

4. The apparatus of claim 1, further comprising at least one secondary securing member increasing the pressure on at least a portion of the fabric.

5. The apparatus of claim 4, wherein the at least one secondary securing member increases the pressure on substantially all of the fabric engaged between the conveyer belt and the diaphragm.

6. The apparatus of claim 1, wherein the original configurations of the first and second outer surfaces of the fabric are complementary web configurations defined by a plurality of woven bias tows.

7. A method for controlling a composite fabric having internal axial tows, comprising:

supporting the fabric with a conveyer belt substantially up to a composite component form;

directly engaging a first outer surface of the fabric with a nonslip portion of the conveyer belt;

engaging a diaphragm on the fabric at a second outer surface of the fabric opposite the first outer surface;

applying pressure on the fabric with the diaphragm;

generating the pressure on the fabric with a vacuum coupled to the diaphragm; and upon displacement of the axial tows of the fabric relative to the first and second outer surfaces, substantially maintaining original configurations of the first and second outer surfaces of the fabric engaged between the conveyer belt and the diaphragm.

8. The method of claim 7, wherein the nonslip portion includes a textured material fixed to the conveyor belt.

9. The method of claim 7, further comprising:
covering the conveyor belt with the nonslip portion.

10. The method of claim 7, further comprising:
increasing the pressure on at least a portion of the fabric with at least one secondary securing member.

11. The method of claim 10, further comprising:
increasing the pressure on substantially all of the fabric engaged between the conveyer belt and the diaphragm with the at least one secondary securing member.

12. The method of claim 7, wherein the original configurations of the first and second outer surfaces of the fabric are complementary web configurations defined by a plurality of woven bias tows.

* * * * *